United States Patent [19]

Henneberry

[11] Patent Number: 4,683,851
[45] Date of Patent: Aug. 4, 1987

[54] ENGINE OIL LEVEL INDICATOR

[76] Inventor: James W. Henneberry, 170 Brixton Rd., S. Garden City, N.Y. 11530

[21] Appl. No.: 839,529

[22] Filed: Mar. 14, 1986

[51] Int. Cl.⁴ .............................................. F01M 1/00
[52] U.S. Cl. ............................ 123/196 S; 123/198 D; 184/108
[58] Field of Search ...................... 123/196 S, 198 D; 184/108, 103.1, 103.2, 6.3

[56] References Cited

U.S. PATENT DOCUMENTS

| | | | |
|---|---|---|---|
| 2,539,604 | 1/1951 | Woolley | 123/196 S |
| 4,091,895 | 5/1978 | Lang | 184/103.1 |
| 4,480,610 | 11/1984 | Stinson | 123/196 S |
| 4,491,103 | 1/1985 | Deadman | 123/196 S |
| 4,522,167 | 6/1985 | Hurner | 184/103.1 |

Primary Examiner—E. Rollins Cross

[57] ABSTRACT

A device for detecting low engine oil levels includes a mechanism for detecting the presence of oil in an oil containment vessel for an engine. A housing is disposed in the containment vessel for enclosing the detection mechanism. A chamber is disposed in the housing and is adapted to permit the free flow of oil therethrough for contact with the detection mechanism according to the level of oil in the containment vessel. The chamber further prevents surging of oil therethrough resulting from movement of the vehicle carrying the engine as well as intermittent splashing of the oil on the detection mechanism resulting from operation of the engine.

23 Claims, 3 Drawing Figures

ENGINE OIL LEVEL INDICATOR

BACKGROUND OF THE INVENTION

1. Field of the Invention

The present invention relates generally to engine oil monitoring devices and, more particularly, to safety devices for shutting down engine operation in the case of oil loss or excessive oil usage. Specifically, the present invention relates to an engine oil monitoring safety device which is based on monitoring the level of oil within the engine oil containment system.

2. Description of the Prior Art

Devices for monitoring engine lubrication systems are well known in the art. Typically, engines such as reciprocating engines require lubrication which is provided by oil held within a containment vessel, more commonly known as an oil pan, mounted below the engine. A cam shaft carrying the piston connecting rods passes through the oil pan. Thus, as the cam shaft is rotated thereby operating the pistons, oil is carried up to the pistons by movement of the connecting rods and cam shaft in the oil pan.

Most engines gradually use some of the oil by burning it in the ignition process. Depending on the condition of the engine, this oil usage can be very minimal or can be quite rapid. In addition, since the oil pan is mounted below the engine, there is always a possibility that the pan may develop a leak of some sort thereby eventually draining the oil from the pan. Thus, it is imperitive that the oil be monitored to insure that there is a sufficient amount of oil within the lubrication system to provide proper lubrication of the engine. To further insure that there is sufficient oil, an oil sump is generally provided as part of the oil containment vessel, the oil sump containing a reservoir of oil for usage by the engine. Without sufficient oil to lubricate the engine, heat from friction and ignition developed within the engine cylinders will quickly ruin the piston rings as well as the engine block itself.

Engine manufacturers provide an oil lubrication containment system in conjunction with the manufactured engine. Moreover, the engine manufacturers generally suggest a recommended minimum volume of oil within such systems necessary to provide proper lubrication of the engine. Inherent in such engine manufacturer recommendations is a built-in safety factor such that should the amount of oil within the engine system fall below the manufacture's recommended level, there will none the less be sufficient oil in the system to provide adequate lubrication for a period of time. However, a point is reached whereby insufficient oil is present to provide even minimally adequate lubrication, thereby permitting excessive heat to be developed within the engine which can result in the damage described above.

Most engines also include an oil pump in association with the oil containment vessel to insure that sufficient oil is pumped into the system immediately below the engine. This is achieved with the pressure developed by the oil pump. In conjunction with such oil pumps, most engines include a monitoring system based on oil pressure within the oil containment and lubrication system. The assumption behind such monitoring systems is that the oil pressure will provide adequate information to determine whether there is sufficient oil being delivered to the system to provide ample lubrication of the engine. Thus, should an oil pump fail for example, the oil pressure is reduced to zero. This informs the operator of the engine that there is no oil pressure within the oil containment vessel and therefore insufficient lubrication being provided to the engine. The operator will then shut down the engine to prevent damage. Another system based on the above includes a safety shutdown device whereby the engine will automatically be shut down should the oil pressure be reduced to zero or some other predetermined level. This eliminates the possibility of human operator error.

A significant flaw, however, has been discovered in the above described systems. It was determined that the oil pumps in some engine lubrication systems were sufficiently large in output such that the combined oil pressure and air pressure developed by the oil pump was sufficient to maintain the pressure output reading from the oil containment vessel at an acceptable level even though the actual amount of oil within the containment vessel fell below the minimum necessary to adequately lubricate the engine. Thus, the monitoring device would indicate that at the oil pressure level was adequate even though the amount of oil within the system was actually inadequate to lubricate the engine. Consequently, the false readings resulted in continued engine operation thereby causing substantial damage due to insufficient oil to lubricate the engine. As a result of the above, it became clear that the monitoring systems based solely on oil pressure were inadequate in certain instances wherein the oil pressure was not directly representative of the actual amount of oil within the oil containment and lubrication system.

SUMMARY OF THE INVENTION

Accordingly, it is one object of the present invention to provide an engine oil monitoring system.

It is another object of the present invention to provide an improved engine shutdown device.

It is a further object of the present invention to provide an engine oil level detection device.

Yet a further object of the present invention is to provide an adaptor for use with an engine oil level monitoring device.

To achieve the foregoing and other objects in and accordance for the purpose of the present invention, a device for detecting low engine oil levels is disclosed. The device includes a mechanism for detecting the presence of oil in an oil containment vessel for an engine. A housing is disposed in the containment vessel for enclosing the detection mechanism. A chamber is disposed in the housing and is adapted to permit the free flow of oil therethrough for contact with the detection mechanism according to the level of oil in the containment vessel. The chamber further prevents surging of oil therethrough resulting from movement of the vehicle carrying the engine as well as intermittent splashing of the oil on the detection mechanism resulting from operation of the engine.

In one preferred embodiment of the invention, the oil detection mechanism includes a device for detecting the presence or absence of oil in the oil pan of the engine by contact with the oil at a preestablished level within the pan. The oil detection device is connected with a device for terminating engine activity upon activation thereof by the oil detection device, thereby automatically shutting down engine activity when the level of oil within the engine oil pan falls below the a predetermined level.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings in which:

DETAILED DESCRIPTION OF THE PREFERRED EMBODIMENTS

Figure 1:
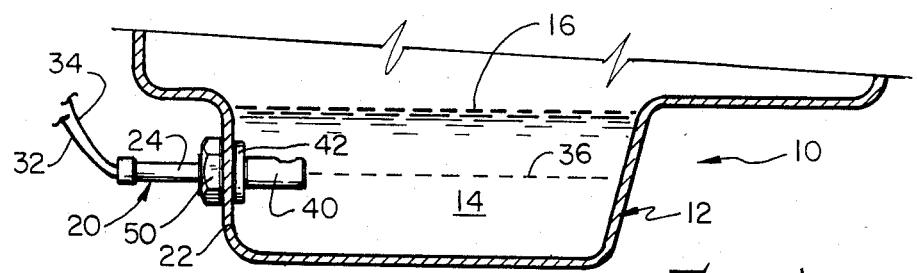
FIG. 1 is a skematic view, with some parts in section, of an engine oil pan having a device constructed in accordance with the present invention mounted to the side wall thereof.

Referring to the figures and in particular to FIG. 1, an engine shutdown device based on an engine oil level detection system is disclosed. Devices for automatically shutting down reciprocating engine operation by turning off the engine are well known in the art. Such devices (not illustrated) automatically shutdown the engine when activated by an electrical signal received from a monitoring device. As previously discussed, prior art monitoring devices typically include oil pressure monitoring systems which signal the shutdown device when a predetermined low oil pressure is sensed. The present invention, however, is based upon sensing and monitoring the actual level of oil within the oil pan system so as to avoid improper readings based on false oil pressure information.

In FIG. 1, a typical oil pan 10 is illustrated having an oil sump portion 12. The vessel 10 contains an amount of oil 14 which has a surface level 16 somewhere within the pan 10. The level 16 can vary substantially depending on usage of the oil 14 by the engine (not illustrated). Typically, the horizontal level 16 is maintained at a point within the vessel 10 so as to provide proper lubrication for the engine mounted above the vessel 10. To monitor the amount of oil 14 within the vessel 10 and to insure that the level 16 is maintained at an acceptable minimum, an oil level detection device 20 is provided. The oil detection device 20 is mounted within the sidewall 22 of the sump portion 12 so that a portion thereof projects into the vessel 10 for direct contact with the oil 14 therewithin.

Figure 2:
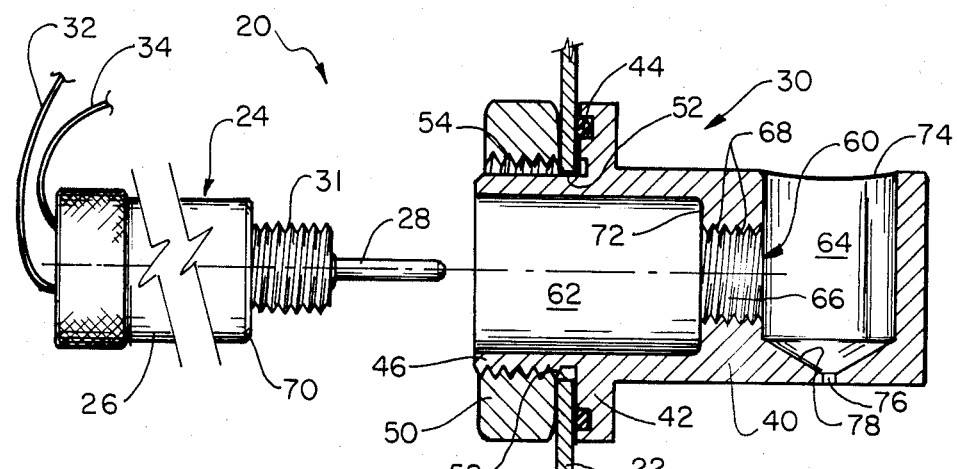
FIG. 2 is a cross-sectional view of an adaptor mounted to an oil pan for use in the present invention and further illustrating an oil detection mechanism in position for insertion into the adaptor.
Figure 3:
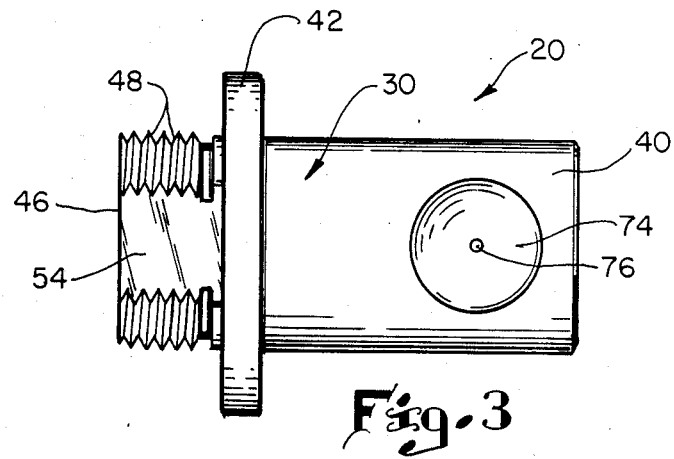
FIG. 3 is a top plan view of the adaptor illustrated in FIG. 2.

Referring more particularly to FIGS. 2 and 3, the engine oil level detection device 20 generally includes a liquid detection member 24 having a base portion 26 and a probe member 28 projecting from the end thereof. The probe member 28 is adapted for direct contact with the liquid, in this instance the oil 14, to determine either the presence or absence thereof around the probe 28. The detection member 24 is inserted within an adaptor 30 for enclosure within the oil 14 of the vessel 10. The base portion 26 includes a threaded section 31 for engagement and retension within the adaptor 30 as described in greater detail below. The liquid detection member 24 may be of any desired and available construction and, in a preferred embodiment, comprises a liquid detection device model number 3NL70 manufactured by Webb company.

The liquid detection member 24 includes a pair of electrical leads 32, 34 which interconnect the member 24 to an engine shutdown device (not illustrated) for activation thereof depending upon the state of the oil 14 within the vessel 10. While any standard engine shutdown device may be used with the present invention, one such preferred device is manufactured by Kysor Cadillac of Michigan, a division of Rysor Industries, Part No. 9038-00080-01. The probe 28 is constructed so as to generate an electrical signal through leads 32, 34 when the probe 28 no longer senses the presence of liquid thereabout. By way of example, the level of the oil 14 within the vessel 10 which is deemed to be the minimally acceptable level to provide minimum lubrication to an engine is indicated by the dashed line 36. If the oil 14 within the sump 12 remains above the level 36, then the probe 28 remains immersed therein and therefor does not activate the engine shutdown device. Likewise, should the oil 14 fall below the level 36, the absence of liquid about the probe 28 generates an electrical signal activating the engine shutdown device.

While the liquid detection member 24 is capable of being directly inserted into the vessel 10, such an arrangement would not operate properly for several reasons. First of all, movement of the vehicle carrying the engine causes the level 16 of the oil 14 within the vessel 10 to change based upon travel up or down steep inclines as well as surgings due to rapid turns and starts/stops. Such rapid, albeit short, changes in the level 16 could momentarily move the oil 14 away from the probe 28. This could provide a momentary output whereby the member 24 would activate the engine shutdown device prematurely. In addition, should the oil 14 fall below the level 36, movement of the oil 14 by operation of the engine could readily cause a splashing or spraying effect of the oil 14 onto a barren probe 28. This situation would provide an improper output indicating the presence of oil even though the oil has actually fallen below the minimum level 36.

To prevent the aforementioned problems and improper outputs, the liquid detection member 24 is preferably encased within the adaptor 30 disposed in the oil pan 10. In preferred form, the adaptor 30 includes a substantially cylindrical housing 40 adaptor for projection into the oil pan 10. A peripheral flange 42 surrounds the base of the cylinder 40 and includes an O-ring 44 or other acceptable sealing member therein for sealing engagement against the inner surface of the oil pan wall 22. Projecting rearwardly from the flange 44 is a substantially cylindrical neck portion 46 having thread members 48 about the outer surface thereof. The neck portion 46 extends through aperture 52 in the wall 22 and projects outwardly from the exterior surface thereof, the O-ring 44 sealing against leakage. A nut or other connecting member 50 is provided to engage the thread members 48 and tighten against the exterior surface of the wall 22 thereby firmly securing the housing 40 in place by compressing the flange 42 against the interior surface of the wall 22.

To insure that the orientation of the housing 40 does not change by rotation of the housing 40 within the aperture 52, a longitudinal portion of the neck 46 is flattened in the form of a land surface 54. A corresponding flat portion is provided in the aperture 52 for mating engagement with the land surface 54 so that the land surface 54 acts a key interlocking with a keyway in the aperture 52. This keying engagement prevents rotation of the housing 40 within the aperture 52. Any other means, however, to prevent such rotation may be utilized with the present invention.

The housing 40 includes an interior chamber arrangement 60 for enclosing the liquid detection member 24. In preferred form, the chamber arrangement 60 includes a substantially axial bore 62 which extends from the end of the neck 46 axially interiorly to the approximate center of the housing 40. The axial chamber 62 is for housing and enclosing the base portion 26 of the device 24. A substantially vertical bore 64 is disposed in the forward end of the housing 40, and a narrowed neck portion 66 interconnects the axial bore 62 and the vertical bore 64. The tubular neck portion 66 includes thread members 68 disposed on the interior surface thereof and are adapted to receive the threaded section 31 of the member 24 thereby firmly engaging the device 24 within the chamber arrangement 60. To insure that oil does not leak from the vertical bore 64 into the axial bore 62, an o-ring or other similar sealing member 70 is disposed on the forward portion of the base member 26 for engagement against the land surface 72 created between the axial bore 62 and the narrowed neck portion 66. As can be seen from FIG. 2, the probe member 28 projects into the vertical bore 64.

The forward portion of the housing 40 and the vertical bore 64 are immersed within the oil 14 in the oil pan 10. The vertical bore 64 includes an entrance mouth 74 disposed on the vertically uppermost surface of the housing 40. The lowermost portion of the bore 64 terminates in a small aperture 76 which interconnects the interior of the axial bore 64 with the exterior of the housing 40 at the vertically lowermost surface of the housing 40. In preferred form, the bottom portion of the bore 64 is in the form of a funnel 78 which terminates in the bottom aperture 76. With this arrangement, oil is free to flow through the mouth 74 into the vertical bore 64 so as to immerse the probe 28 therewithin. The aperture 76 allows gravity flow of the oil through the bottom of the bore 64 so as to allow the level of the oil within the bore 64 to match that of the oil 14 exterior to the housing 40. Thus, as the level of the oil 14 approaches the level 36 outside the housing 40, it likewise approaches the level 36 within the vertical bore 64. Should the oil 14 fall below the level 36 exterior to the housing 40, the oil will likewise fall below the level 36 within the bore 64 due to the free flow of oil within the bore 64 from the mouth 74 through the opening 76. Thus, oil is free to flow vertically within the bore 64 to permit the probe 28 to be in contact with or detect the absence of oil therearound, depending on the level of the oil within the oil pan 10.

The above arrangement has several significant advantages. First, the oil 14 basically only enters the bore 64 through the mouth 74. Since the probe 28 can only be contacted by oil within the bore 64, the level of the oil within the bore 64 will not tend to rapidly fluctutate with the level of the oil 14 in the pan 10 when such fluctuations are temporary due to rapid turning, starting/stopping or movement up and down inclines by the vehicle carrying the oil pan 10. Thus, the probe 28 will not be temporarily exposed to air and thereby provide an output reading indicating a supposed absence of oil.

Likewise, since the opening 76 is very small compared to the width of the bore 64, oil cannot splash upwardly from beneath the housing 40 onto the probe 28. Thus, the funnel portion 78 of the housing 40 protects the probe 28 within the bore 64 from intermittent spraying or splashing of oil from beneath the housing 40 yet permits oil to flow freely on a gravity basis from the bore 64 outwardly below the housing 40. This is an important factor. As previously described, the cam shaft and piston rods move within the oil pan 10 thereby tending to cause oil to splash therewithin. Even when the level of the oil 14 within the pan 10 is below the minimum lubricating level 36, such movement of the cam shaft and piston rods would tend to splash oil onto the probe 28 if the probe 28 were completely exposed from beneath the housing 40. Such intermittent spraying or splashing would provide false readings from the probe 28 in that the probe 28 would detect the presence of oil and therefore not activate the engine shutoff device even though the oil has fallen below the minimum level 36. As a result of the arrangement of the present invention, however, such intermittent spraying or splashing of the probe 28 cannot occur. Thus, should the level of the oil 14 fall below the minimum level 36, that is the level of the probe 28 within the pan 10, the device 24 would indicate the absence of oil around the probe 28 and would consequently send a signal activating the engine shutdown device. The engine shutdown device would then terminate engine operations and thereby prevent damage to the engine pistons, rings and other components as a result of insufficient lubrication.

Placement of the device 20 within the oil pan 10 is critical. Such placement depends upon the capacity of the oil pan 10 as well as the size of the engine and the mounting angle of the engine within the vehicle carrying the engine. It should be noted that an engine may be mounted as much as 6° off the horizontal, therefore varying the level of the oil 14 within the pan 10 without any relevance to actual oil usage. If such factors as engine mounting, engine size and oil pan size and configuration are not taken into consideration, placement of the device 20 may not be appropriate and may therefore shutdown the engine prematurely.

It is preferred that the device 20 be placed within the pan 10 such that the level 36 is reached when one-half of the manufacturer's recommended cpacity of lubricant is present. For example, if a total of 5 quarts is necessary to fully fill the pan 10 and lubricate the engine attached thereto, the manufacturer may recommend that oil be added when 4 quarts remain. However, as previously mentioned, there is a built-in safety factor to any such manufacturer's recommendations. Therefore, in accordance with the present invention, the device 20 would be located relative to a particular engine in a particular vehicle so that the probe 28 would be at the level 36 which would represent two and one-half quarts of oil remaining in the oil pan 10. Thus, should the oil pan 10 lose two and one-half quarts either through usage or leakage, thereby bringing the oil level below the level 36, the probe 28 would detect the absence of oil and thereby activate the engine shutdown device. Placement of the device 20 within the pan 10 also depends upon the configuration thereof as well as the location of the sump 12. These are important factors in preventing temporary lowering of the level of the oil 14 due to rapid turning or acceleration/deceleration of the vehicle or climbing hills. Should the device 20 to be located relatively high within the oil pan 10, the oil within the vertical bore 64 would not remain accurate when acute angles are obtained as a result of rapid uphill/downhill movement, right/left turns and stopping/starting. Thus, accurate placement of the device 20 must be determined on a specific case by case basis for each engine/vehicle combination.

Tests were conducted to determine the accuracy and reliability of the present invention. Bench mock-up tests were initially conducted utilizing actual heavy duty engine oil pans which were different in size and configuration for each engine model/manufacturer. The mock-up pans were selected in anticipation of the field test described below. In each bench test, the oil pan was equipped with a precisely located detection device 20 having appropriate electrical connections plus a see-through cover to permit visual observations and determine the oil level when 'shutdown' occurred. The pan assembly was then cradled in a fixture which permitted tilting of the pan forward and backward to simulate uphill and downhill attitudes and acceleration/deceleration/turning surgings that would occur in normal vehicle operation and travel. Observations were then made of the oil level movement within the pan through all the above simulations of actual vehicle travel. These observations were first made with the pan at its manufacturer's maximum rated capacity. The procedure was then repeated after each of several removals of one quart of oil until it was determined what the minimum oil level was before automatic engine shutdown occurred. The tests were conducted with a goal of operating the engine without shutdown until the oil dropped to approximately ½ the manufacturer's recommended capacity and to positively shut down engine operations when the level fell to less than ½ capacity. Revisions were then made, when necessary, to the installation location on the bench model until the above stated goals were achieved with each particular bench model.

After the above bench-model test were conducted for various oil pan/engine designs, heavy duty refuse collection trucks operating on full collection schedules were each equipped with low-oil level sensor devices 20 constructed in accordance with the present invention. The installation location on each oil pan of each truck was determined based on the bench-model test results for that particular mock-up. Standard test runs through city streets were then conducted to determine operating and shutdown reliability. Testing included the matter of ascertaining whether engine operating temperatures are adversely affected with oil levels at less than capacity.

In the field study tests, each refuse collection vehicle was first operated over a test route with its oil reservoir at its rated full capacity. Oil temperatures were then taken at each of the following stages: Start (engine at normal coolant and oil operating temperature); 5° uphill grade; 7° uphill grade; 10° uphill grade; after travelling a specified distance at 25 mph and then 40 mph; and after 20 continuous cyclings of compaction equipment of the truck on a hill. After the above, each vehicle was then operated over the same course on the same day (to achieve temperature consistency) with 1 quart less of oil. Observations were specifically made for oil temperature fluctuations and indicated grades and when turning corners. The above procedure was again repeated with 2 quarts less of oil, 3 quarts less, 4 quarts less and so forth until engine shutdown occurred equivalent to the goals set forth for the bench model tests. As a result of the above, a typical 16-quart capacity oil pan with a diesel engine was shutdown by the device 20 when it was 8 quarts low (½ capacity) on level terrain and when going downhill and when 7 quarts low on steep uphill grades. At half-capacity, there were no significant oil temperature changes during the test runs.

Finally, the vehicles tested above with their low-oil level detection safety devices were put back into normal daily operational use. Periodic checks on these vehicles were made over a period of at least 3 months to ascertain that there was no interruption (engine shutdown) when the oil level was at least at half-capacity and to verify that the engines would in fact shut down at or just below half-capacity level. Observations in actual use verified and confirmed that the present invention operated properly and with total reliability with no unwarrented interruption of vehicle service.

As can be seen from the above, standard oil pressure monitoring devices are not necessarily adequate to monitor the engine oil so as to prevent engine damage due to acute shortage of oil within the oil containment vessel. The device of the present invention, however, measures the level of the oil within the oil containment vessel and thereby permits accurate monitoring of the oil therewithin. The device of the present invention may be located in any desired position within the oil pan so as to indicate any preselected level of oil therewithin. As previously indicated, the preferred predetermined oil level is at one-half the capacity of the oil pan. The device of the present invention may be utilized so as to directly notify the vehicle operator of low engine oil or it may be interconnected with an automatic engine shutdown device so as to automatically shut down operation of the engine when the predetermined oil level is reached. This prevents damage to the engine and insures proper preventive maintenance before damage is done. Finally, it should be noted that the device of the present invention may be retroactively fitted on all existing engine oil systems without significant modification of the engine oil containment vessel and without interference of proper operation of the engine. It also prevents premature engine shutdown due to fluctuations in engine oil levels due to severe operation of the vehicle containing the engine.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

I claim:

1. A device for detecting low engine oil levels comprising:
    means for detecting the presence of oil in an oil containment vessel for said engine, said detection means including a probe member adapted to detect the presence of oil when in contact therewith;
    housing means disposed in said containment vessel for enclosing said detection means; and
    chamber means disposed in said housing means and adapted to permit the free flow of oil therethrough for contact with said detection means according to the level of oil in said containment vessel, said chamber means further preventing surging of oil therethrough resulting from movement of the vehicle carrying said engine as well as intermittent splashing of said oil on said detection means resulting from operation of said engine.

2. The device as claimed in claim 1, wherein said detection means is interconnected with an engine shutdown device which is activated when said probe member senses the absence of oil therearound.

3. A device for detecting low engine oil levels comprising:
 means for detecting the presence of oil in an oil containment vessel for said engine;
 housing means disposed in said containment vessel for enclosing said detection means, said housing means including a substantially cylindrical member projecting into said oil containment vessel and adapted to contain a portion of said detection means to sense the presence of oil in said chamber means; and
 chamber means disposed in said housing means and adapted to permit the free flow of oil therethrough for contact with said detection means according to the level of oil in said containment vessel, said chamber means further preventing surging of oil therethrough resulting from movement of the vehicle carrying said engine as well as intermittent splashing of said oil on said detection means resulting from operation of said engine.

4. The device as claimed in claim 3, wherein said chamber means is defined in part by a a bore adapted for vertical alignment and having a wide upper mouth for free flow of oil therein and a narrow bottom aperture to permit gravity flow of oil therethrough, said narrow bottom aperture preventing the intermittent splashing of oil into the interior of said bore from beneath said cylindrical member.

5. The device as claimed in claim 4, wherein said housing means further includes means for retaining the position of said cylindrical member relative to said containment vessel so as to retain the vertical alignment of said bore.

6. The device as claimed in claim 5, wherein said retaining means comprises a non-uniformly shaped peripheral portion adapted for mating engagement with a similarly non-uniformly shaped aperture in the wall of said containment vessel to prevent rotational movement of said housing means relative to said containment vessel wall.

7. The device as claimed in claim 4, wherein said bore is sized and shaped to permit said detection means to sense the absence of oil therearound when the oil level within said containment vessel falls below the level of said detection means within said bore.

8. The device as claimed in claim 7, wherein said substantially cylindrical member is positioned within said oil containment vessel to detect the absence of oil in contact therewith when the oil level within said containment vessel is less than one-half the total capacity thereof.

9. An adaptor for use in an engine oil detection system having an oil detection device having a probe adapted to sense the presence and absence of oil within an engine oil pan, said adaptor comprising:
 housing means disposed in said oil pan and including a chamber adapted for enclosing said oil detection probe;
 entrance means communicating with said chamber from the upper vertical surface of said housing means and adapted to permit free flow of oil into said chamber to immerse said detection probe in accordance with the level of oil in said oil pan; and
 exit means communicating with said chamber from the vertical lowermost surface of said housing means and adapted to permit gravity flow of oil therethrough from said chamber to enable the level of oil in said chamber to adjust to the level of oil in said pan, said exit means further preventing intermittent spraying of oil into said chamber from beneath said housing means.

10. The adaptor as claimed in claim 9, wherein said entrance means comprises an aperture substantially the same diameter as the width of said chamber to permit the level of oil in said chamber to adjust to and reflect the level of oil in said oil pan outside said housing means.

11. The adaptor as claimed in claim 9, wherein said exit means comprises a small aperture sized to permit the gravity drain of oil from said chamber while preventing the splashback of oil into said chamber resulting from operation of said engine.

12. The adaptor as claimed in claim 11, wherein said exit means comprises a pinhole.

13. The adaptor as claimed in claim 9, wherein said oil detection device includes a base portion having a probe member extending into said chamber.

14. The adaptor as claimed in claim 13, wherein said housing means comprises a cylindrical member having an axial bore adapted to receive said base portion, and wherein said chamber comprises a vertically aligned bore disposed in said cylindrical member and adapted to receive said probe member therein, said cylindrical member further including means for sealing said vertical bore from said axial bore when said detection device is in position within said housing means to prevent leakage of oil between said bores.

15. The adaptor as claimed in claim 14, wherein said vertically aligned bore is sized and shaped to permit sufficient oil to flow therein to adjust to and reflect the level of oil within said oil pan yet prevent oil from flowing out of said chamber due to sudden changes in the horizontal orientation of said oil pan and engine.

16. The adaptor as claimed in claim 9, wherein said housing means includes means for retaining the position of said housing means and the alignment of said chamber relative to said oil pan.

17. The adaptor as claimed in claim 16, wherein said retaining means comprises a non-uniformly shaped peripheral portion adapted for mating engagement with a similarly non-uniformly shaped aperture in the wall of said oil pan to prevent rotational movement of said housing means relative to said oil pan wall.

18. An engine shutdown device comprising:
 means for terminating engine activity upon activation thereof;
 means for detecting a predetermined critical level of oil in the oil pan of said engine by contact therewith;
 housing means for enclosing said oil detection means within said oil pan;
 chamber means disposed within said housing means and adapted to receive said oil detection means for contact with oil therein;
 oil entrance means communicating with said chamber means to permit the free flow of oil into said chamber means to immerse said detection means in accordance with the level of oil present in said oil pan; and
 oil exit means communicating with said chamber means and adapted to permit gravity flow of oil therethrough from said chamber means to adjust the level of oil in said chamber means in accordance with the level of oil in said oil pan, said oil exit means further preventing intermittent spraying of oil into said chamber means from beneath said housing means.

19. The device as claimed in claim 18, wherein said oil detection means includes a probe member positioned in said chamber means to contact oil therein in accordance with the level of oil in said oil pan.

20. The device as claimed in claim 18, wherein said chamber means is substantially vertically aligned so that said entrance means is disposed on the vertically upper surface of said housing means and said exit means is disposed on the vertically lowermost surface of said housing means.

21. The device as claimed in claim 20, wherein said entrance means comprises an enlarged opening communicating with said chamber means to permit oil to flow freely therewithin in accordance with the level of oil in said oil pan while preventing oil from moving out of said chamber means due to temporary angular orientation of said oil pan and engine.

22. The device as claimed in claim 21, wherein said exit means comprises a small aperture sized to permit gravity drain and free flow of oil from said chamber means while preventing splashback of oil into said chamber means from beneath said housing means thereby preventing improper oil contact with the detection means disposed in said chamber means.

23. The device as claimed in claim 18, wherein said housing means include means for retaining the position of said chamber means and said oil entrance and exit means relative to the wall of said oil pan by preventing rotational movement of said housing means relative to the wall of said oil pan.

* * * * *